(12) United States Patent
Tao et al.

(10) Patent No.: US 10,902,615 B2
(45) Date of Patent: Jan. 26, 2021

(54) HYBRID AND SELF-AWARE LONG-TERM OBJECT TRACKING

(71) Applicant: QUALCOMM Incorporated, San Diego, CA (US)

(72) Inventors: Ran Tao, Amsterdam (NL); Efstratios Gavves, Amsterdam (NL); Arnold Smeulders, Amsterdam (NL)

(73) Assignee: Qualcomm Incorporated, San Diego, CA (US)

( * ) Notice: Subject to any disclaimer, the term of this patent is extended or adjusted under 35 U.S.C. 154(b) by 124 days.

(21) Appl. No.: 16/186,391

(22) Filed: Nov. 9, 2018

(65) Prior Publication Data

US 2019/0147602 A1 May 16, 2019

Related U.S. Application Data

(60) Provisional application No. 62/585,399, filed on Nov. 13, 2017.

(51) Int. Cl.
*G06T 7/246* (2017.01)
*G06T 7/73* (2017.01)
*G06K 9/62* (2006.01)
*G06K 9/00* (2006.01)

(52) U.S. Cl.
CPC .......... *G06T 7/248* (2017.01); *G06K 9/00771* (2013.01); *G06K 9/6215* (2013.01); *G06K 9/6256* (2013.01); *G06K 9/6267* (2013.01); *G06K 9/6292* (2013.01); *G06T 7/74* (2017.01); *G06K 2009/6213* (2013.01); *G06K 2209/21* (2013.01); *G06T 2207/10016* (2013.01); *G06T 2207/20081* (2013.01); *G06T 2207/20084* (2013.01)

(58) Field of Classification Search
CPC .................. G06T 7/248; G06T 7/70
See application file for complete search history.

(56) References Cited

U.S. PATENT DOCUMENTS

| 6,901,110 | B1 | 5/2005 | Tsougarakis et al. |
| 7,756,296 | B2 | 7/2010 | Porikli et al. |
| 7,835,542 | B2 | 11/2010 | Lin et al. |
| 9,147,260 | B2 | 9/2015 | Hampapur et al. |
| 2013/0100350 | A1* | 4/2013 | Gu ............ H04N 5/14 348/571 |
| 2017/0263003 | A1* | 9/2017 | Feldman ......... G06T 7/254 |
| 2018/0061076 | A1* | 3/2018 | Wang ............ G06T 7/20 |

OTHER PUBLICATIONS

D. B. Venkatewaran, "Object Tracking using Deep Kalman Filter," Spring Jun. 2017, pp. 4321-4326. (Year: 2017).*

(Continued)

*Primary Examiner* — Myron Wyche
(74) *Attorney, Agent, or Firm* — Seyfarth Shaw LLP

(57) ABSTRACT

A method of tracking an object includes performing a hybrid search over a sequence of frames. The hybrid search includes periodically performing a global search on selected frames of the sequence of frames and performing a local search on frames between the selected frames of the global search. The method also includes updating a similarity function based on a result of the hybrid search. The method further includes tracking the object based on the hybrid search.

30 Claims, 12 Drawing Sheets

(56) References Cited

OTHER PUBLICATIONS

Bertinetto L., et al., "Fully-Convolutional Siamese Networks for Object Tracking," European Conference on Computer Vision, arXiv:1606.09549v2 [cs.CV] Sep. 14, 2016, pp. 1-16.
Danelljan M., et al., "ECO: Efficient Convolution Operators for Tracking", 2017, pp. 6638-6646.
Henriques J.F., et al., "High-Speed Tracking with Kernelized Correlation Filters," IEEE Transactions on Pattern Analysis and Machine Intelligence, arXiv:1404.7584v3 [cs.CV] 2014, pp. 1-14.
Kristan M., et al., "The Visual Object Tracking VOT2015 Challenge Results", IEEE International Conference on Computer Vision Workshop (ICCVW), 2015, 25 pages.
Smeulders A.W.M., et al., "Visual Tracking: An Experimental Survey," IEEE Transactions on Pattern Analysis and Machine Intelligence, 2014, vol. 36, No. 7, pp. 1442-1468.
Tao R., et al., "Siamese Instance Search for Tracking," IEEE Conference on Computer Vision and Pattern Recognition (CVPR), Jun. 27, 2016, XP055436681, pp. 1420-1429, DOI: 10.1109/CVPR.0816.158 [retrieved on Dec. 9, 201].
Wu Y., et al., "Online Object Tracking: A Benchmark," IEEE Conference on Computer Vision and Pattern Recognition 2013, pp. 2411-2418.
Yin., Z., et al., "Object Tracking and Detection after Occlusion via Numerical Hybrid Local and Global Mode-seeking," IEEE Conference on Computer Vision and Pattern Recognition, 2008, pp. 1-8.

\* cited by examiner

HYBRID AND SELF-AWARE LONG-TERM OBJECT TRACKING

CROSS-REFERENCE TO RELATED APPLICATION

The present application claims the benefit of U.S. Provisional Patent Application No. 62/585,399 filed on Nov. 13, 2017, and titled "HYBRID AND SELF-AWARE LONG-TERM OBJECT TRACKING," the disclosure of which is expressly incorporated by reference herein in its entirety.

BACKGROUND

Field

Aspects of the present disclosure generally relate to object tracking and, more particularly, to systems and methods for tracking an object over an extended sequence of frames.

Background

An artificial neural network, which may comprise an interconnected group of artificial neurons (e.g., neuron models), is a computational device, or represents a method to be performed by a computational device. An artificial neural network (ANN) may track a target over a sequence of frames, such as a video. For example, a target tracker may predict the location of a target over a video sequence given an observation of the target at an initial frame of the sequence. Target tracking (e.g., object tracking) may be used for various applications in internet protocol (IP) cameras, Internet of Things (IoT), autonomous driving, and/or service robots. The object tracking applications may improve the understanding of object paths for planning. For example, during autonomous driving, action localization is used to avoid collisions with pedestrians and cyclists.

Conventional target trackers analyze short videos, such as videos with a duration of approximately ten to twenty seconds. Additionally, conventional target trackers assume the target is present in a frame during the duration of the video. Still, in real-world scenarios, a target tracker may track a target for a duration that is greater than twenty seconds. Furthermore, in real-world scenarios, there may be one or more instances when the target disappears from one or more frames, of a sequence of frames, and reappears, at a later time, in another frame.

It is desirable to improve methods and systems for tracking a target for an extended period. It is also desirable to improve methods and systems for tracking a target that may disappear from one frame and reappear in another frame.

SUMMARY

In one aspect of the present disclosure, a method for tracking an object is disclosed. The method includes performing a hybrid search over a sequence of frames. The method also includes updating a similarity function based on a result of the hybrid search. The method further includes tracking the object based on the hybrid search.

Another aspect of the present disclosure is directed to an apparatus including means for performing a hybrid search over a sequence of frames. The apparatus also includes means for updating a similarity function based on a result of the hybrid search. The apparatus further includes means for tracking the object based on the hybrid search.

In still another aspect of the present disclosure, a non-transitory computer-readable medium has non-transitory program code recorded thereon. The program code is for tracking an object. The program code is executed by a processor and includes program code to perform a hybrid search over a sequence of frames. The program code also includes program code to update a similarity function based on a result of the hybrid search. The program code further includes program code to track the object based on the hybrid search.

Yet another aspect of the present disclosure is directed to an apparatus for tracking an object. The apparatus has a memory and one or more processors coupled to the memory. The processor(s) is configured to perform a hybrid search over a sequence of frames. The processor(s) is also configured to update a similarity function based on a result of the hybrid search. The processor(s) is further configured to track the object based on the hybrid search.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
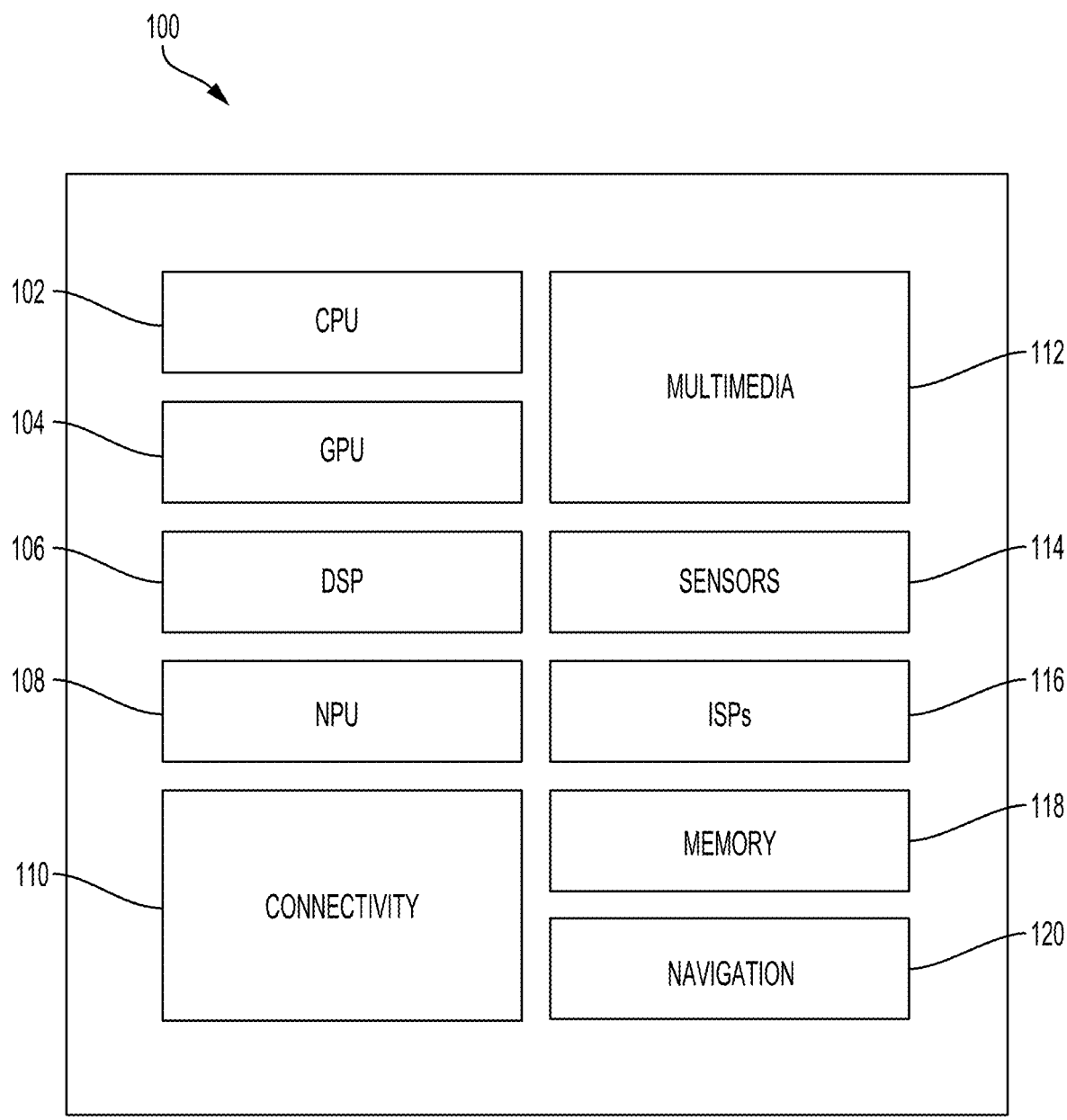
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Methods and systems for target tracking are trained to track a target during changing conditions. The conditions may include, for example, illumination, viewpoint, and/or occlusion. Conventional target trackers (e.g., conventional trackers), such as discriminative correlation filter (DCF) trackers, may update a tracking model during tracking to account for the changing conditions. The updates may be performed every frame or once every n frames. Updates to the tracking model may improve tracking when the videos are shorter than a time threshold (e.g., approximately twenty seconds).

For videos longer than the time threshold, aggressive (e.g., frequent) updates to the tracking model may reduce performance and increase the use of system resources. Aggressive updates refer to frequent updates that do not consider whether the update is beneficial or adverse to the tracking model. Additionally, for videos that are longer than the time threshold, updating the tracking model may lead to model drift where the internal model can no longer represent the target. Consequently, the tracker may track the wrong target. To improve target tracking, model drift should be considered when determining how and when to apply a model update.

Conventional trackers localize the target in a frame by searching around a target's predicted location in the previous frame. Conventional trackers assume the previous prediction is accurate and also assume the target continuously moves at a steady pace from one frame to the next. Still, the previous prediction may not be accurate. In addition, the target may not move at a steady pace from one frame to the next. Thus, the conventional trackers' assumptions may lead to tracking failures.

Conventional trackers also do not account for a target disappearing from a camera's view (e.g., frame t) and later re-appearing in the camera's view (e.g., frame t+n, where n>1). When the target re-appears, the target may enter the camera's view (e.g., camera field) at an arbitrary position. Sampling drift occurs when the tracker cannot find the target due to the target moving out of an area processed by the tracker. That is, conventional trackers only process a portion of the frame centered around a target's location that was predicted in the previous frame.

Sampling drift may also occur when the target is present in the camera's view but is not present in the area processed by the tracker (e.g., the portion of the frame centered around a target's previously predicted location). The target may not be present in the area processed by the tracker if the target's location sporadically changes from one frame to the next. For example, the target may not be present in an area if the target quickly or abruptly moves from one frame to another. Aspects of the present disclosure are directed to addressing sampling drift when tracking a target over a sequence of frames, such as a sequence of frames with a duration greater than the time threshold.

Some conventional trackers, such as Siamese trackers, learn a similarity function offline. The similarity function compares target candidates with an initial target patch to predict a target location. After the offline learning, the similarity function is not updated during online tracking. That is, in conventional Siamese trackers, the similarity function is fixed after offline training. Conventional Siamese trackers use the similarity function to compare the candidates with a template (e.g., image patch of the target). The candidate most similar to the template is selected as the prediction. In conventional Siamese trackers, the template is fixed. That is, conventional Siamese trackers always use the initial image patch of the target from an initial frame of the sequence as the template. Conventional trackers, such as Siamese trackers, that do not perform online model updates (e.g., updates to a similarity function) may mitigate model drift. Still, these conventional trackers may fail when one or more objects similar to the true target are present in a frame. For example, if the Siamese tracker is tracking a blonde woman in a red dress, the Siamese tracker may fail if another blonde woman in a red dress appears in one or more frames.

Aspects of the present disclosure are directed to a target tracker that uses a similarity comparison with a hybrid search (e.g., global search and local search). The hybrid search reduces sampling drift. Furthermore, the tracker uses a reduced number of model updates in comparison to conventional trackers. The reduced model updates improve a robustness against model drift while overcoming intrinsic limitations of conventional trackers, such as Siamese trackers. In one configuration, the reduced model updates are based on a prediction quality determined by a self-aware module (e.g., self-evaluation module). According to aspects of the present disclosure, the tracker can track targets for a period of time that is longer than the period of time of conventional trackers. Thus, aspects of the present disclosure provide improved functionality in comparison to conventional trackers.

FIG. 1 illustrates an example implementation of a system-on-a-chip (SOC) 100, which may include a central processing unit (CPU) 102 or a multi-core CPU configured to perform hybrid and self-aware long-term object tracking in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may comprise code to perform a hybrid search over a sequence of frames. The instructions loaded into the general-purpose processor 102 may also comprise code to update a similarity function based on a result of the hybrid search. The instructions loaded into the general-purpose processor 102 may further comprise code to track the object based on the hybrid search.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
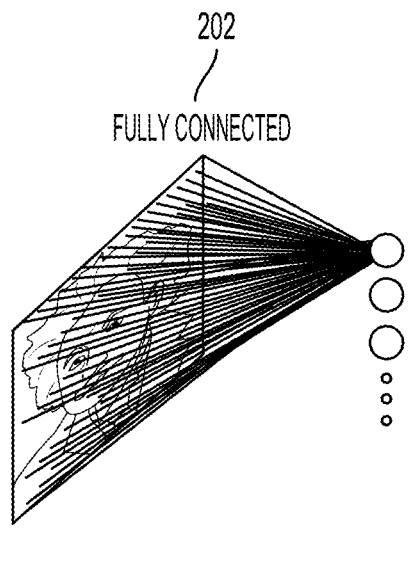
FIGS. 2A, 2B, and 2C are diagrams illustrating a neural network in accordance with aspects of the present disclosure.
Figure 2B:
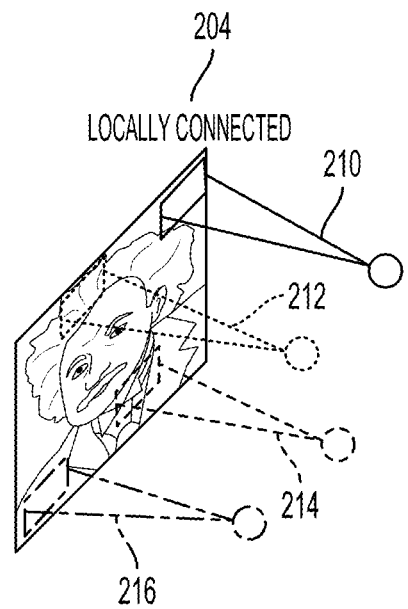

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
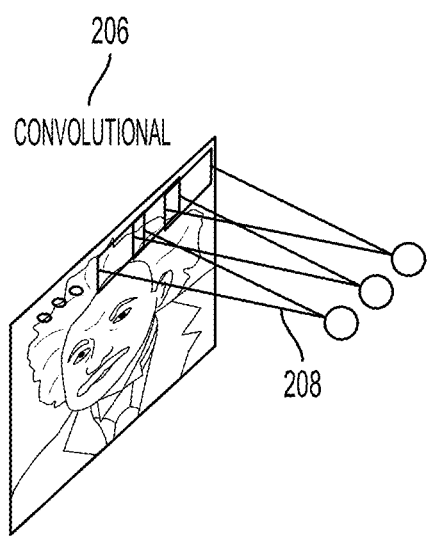

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
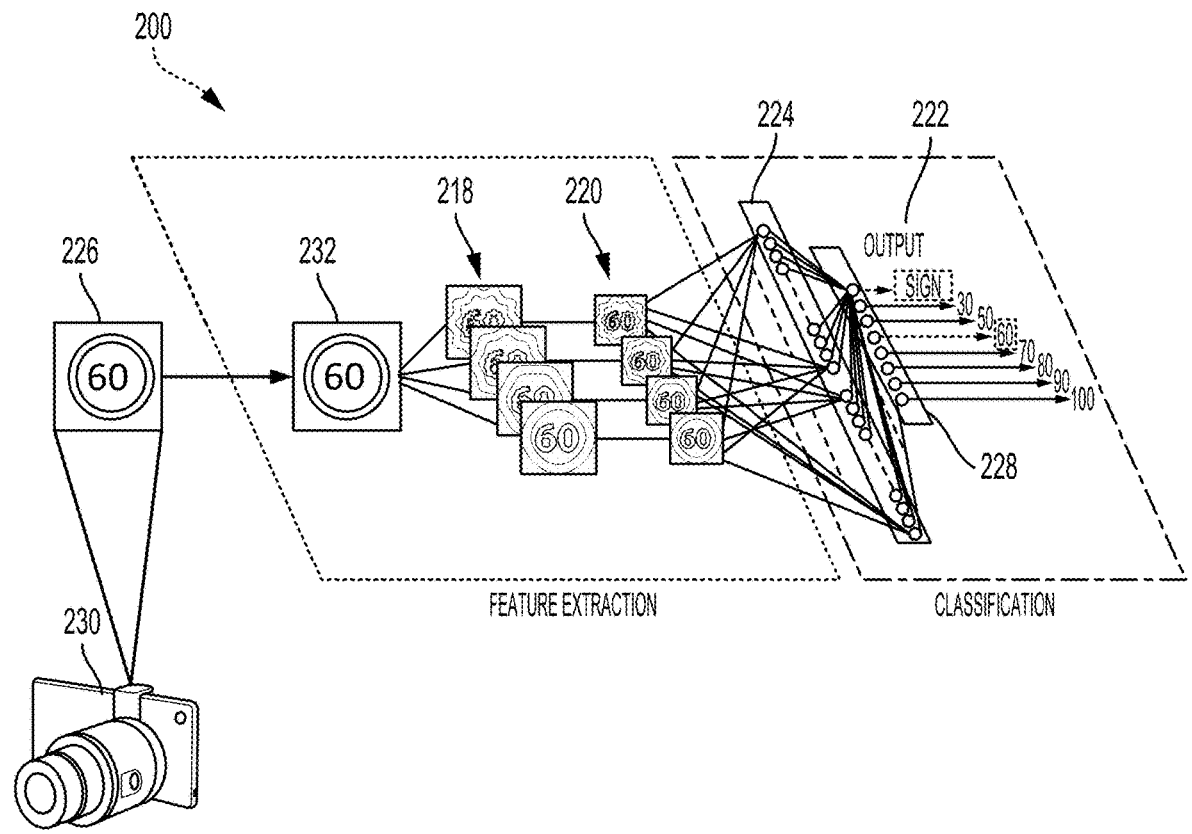
FIG. 2D is a diagram illustrating an exemplary deep convolutional network (DCN) in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 226) and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
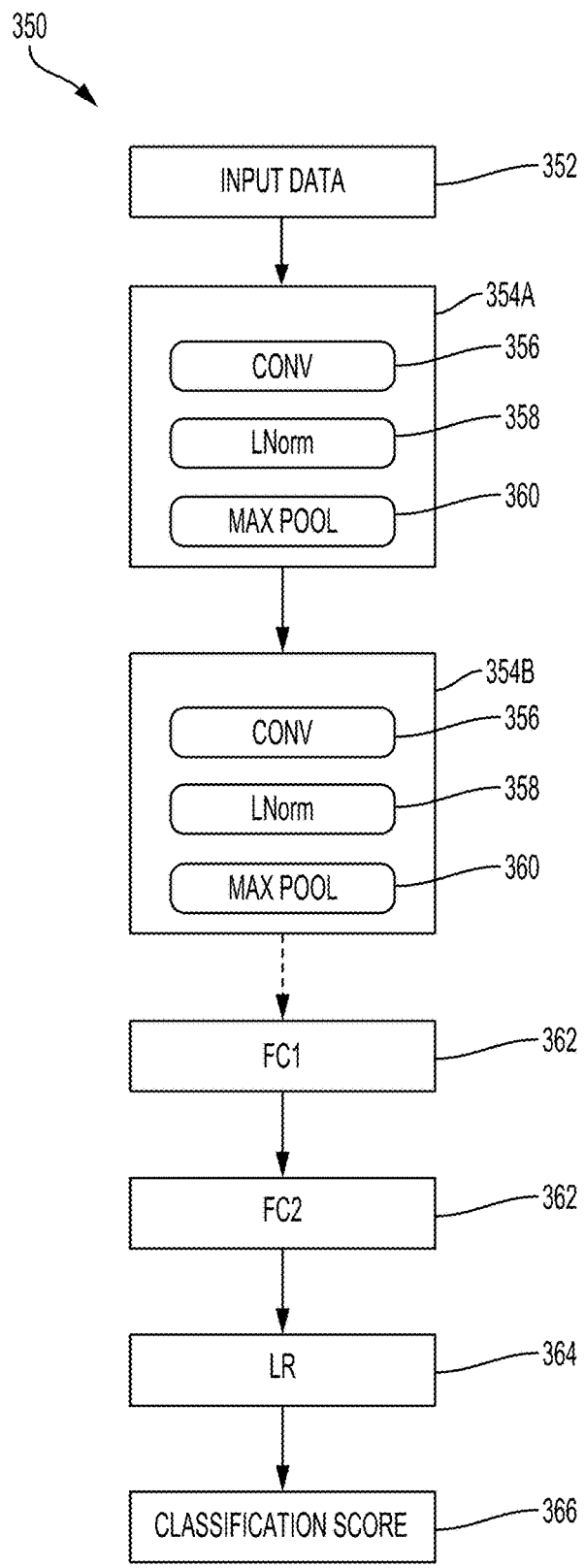
FIG. 3 is a block diagram illustrating an exemplary deep convolutional network (DCN) in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

In one configuration, an object tracking model is configured for performing a hybrid search over a sequence of frames. The object tracking model is also configured for updating a similarity function based on a result of the hybrid search. The object tracking model is further configured for tracking the object based on the hybrid search. The model includes a hybrid searching means, updating means, and/or tracking means. In one aspect, the hybrid searching means, updating means, and/or tracking means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

Figure 4:
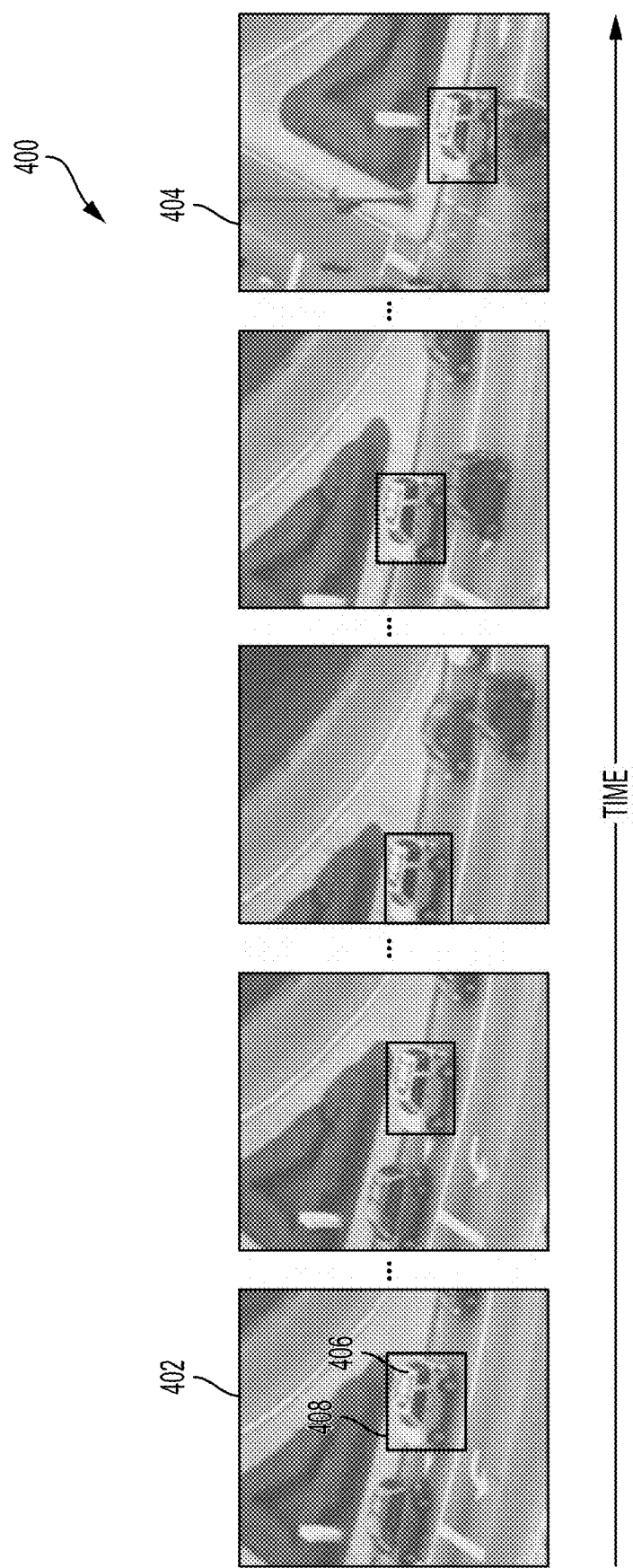
FIG. 4 illustrates an example of object tracking according to aspects of the present disclosure.

FIG. 4 illustrates an example of target tracking 400 according to aspects of the present disclosure. As shown in FIG. 4, a target 406 is tracked by a target tracking system (e.g., artificial neural network tracker) over a sequence of frames (e.g., first frame 402 to $n^{th}$ frame 404). The target 406 is an object in a frame. Each target 406 may be given a unique object ID so the target may be tracked through subsequent frames. As shown in FIG. 4, the target 406 may be localized with a bounding box 408.

According to aspects of the present disclosure, for an incoming frame (e.g., current frame), a tracker (e.g., target tracking system) searches for a candidate having a greatest similarity to an original image patch of a target in a first frame (e.g., initial frame) of a sequence of frames. The similarity function may be a two branch artificial neural network, such as a Siamese network. To reduce sampling drift, the tracker uses a hybrid search that is a combination of a global search and a local search. To reduce model drift, a self-evaluation module assesses a quality of the tracker's predictions. In one configuration, a model update to a similarity function is performed when the self-evaluation module determines a quality of a prediction is above a quality threshold.

The model update to the similarity function may be based on training pairs that include a positive pair and one or more negative pairs. The positive pair may include an initial target and a most likely candidate box from a current frame. The most likely box may be the predicted location of the target in the current frame (see FIG. 5A, final bounding box 534) selected from multiple candidate boxes. The initial target may be the target from the previous frame or the target from the first frame of a sequence of frames.

Figure 5A:
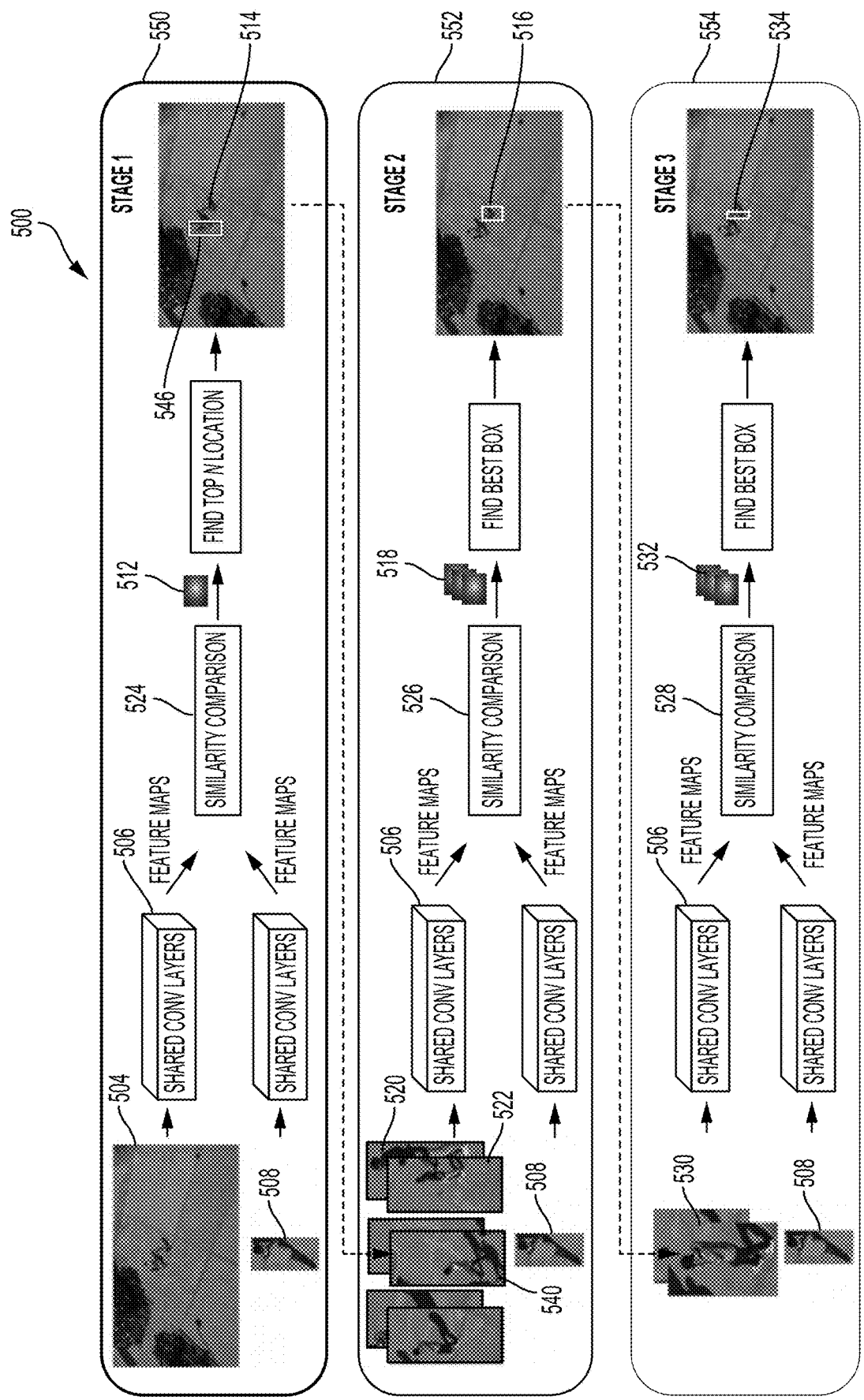
FIG. 5A illustrates an example of a global target search according to aspects of the present disclosure.

Additionally, the negative pairs may include the initial target and one or more candidate boxes selected from the multiple candidate boxes. The one or more candidate boxes used for the negative pair are different from the most likely box. For example, as shown in FIG. 5A, a candidate box 540 may be a candidate box used for a negative pair. The one or more candidate boxes used for the negative pair may be different scaled candidate boxes obtained at the second stage of the global search. The one or more candidate boxes are boxes that do not overlap with the most likely box. That is, the one or more candidate boxes are different from the most likely box.

Aspects of the present disclosure are directed to a hybrid search that is a combination of the global search and the local search. In one configuration, the global search is a search across a full region of a current frame for the target. The global search may also search the current frame with various scales. The local search performs a search for the target, in a current frame n, around a predicted target position from a previous frame (n−1). The local search also performs the search over scales that are similar to the previously estimated scale of the target. To reduce sampling drift while improving tracking speed, the hybrid search performs the global search once every t frames while performing the local search on frames between the global search frames. For example, the global search may be performed once every five frames, independent of the local search. In this example, the local search would be performed in frames one to four, six to nine, eleven to fourteen, etc., while the global search is performed in frames five, ten, fifteen, etc.

The target tracker may be an artificial neural network. The artificial neural network may be defined in an autonomous vehicle, a semi-autonomous vehicle, a robotic device, a mobile device, and/or a stationary computing device. One or more devices may be controlled based on the tracked target. For example, the target tracker may be defined in an autonomous vehicle, such as an aerial drone. In this example, the autonomous vehicle may use the target tracker to follow a target. In another example, the target tracker may be defined in a security system for an arena. In this example, the target tracker may track a suspect throughout the arena and control one or more robotic devices to follow the suspect.

FIG. 5A illustrates an example of a global search 500 according to aspects of the present disclosure. In one configuration, the global search 500 is a three stage process (e.g., a first stage 550, a second stage 552, and a third stage 554). In the first stage 550, the tracker searches, at a single scale, over an entire region of a current frame 504. That is, as shown in FIG. 5A, convolutional layers 506 (e.g., shared convolution layers) receive the current frame 504 and a target patch 508 from a first frame of a sequence of frames. The convolutional layers 506 generate feature maps of the current frame 504 and the target patch 508.

A first similarity function 524 receives the feature maps of the current frame 504 and the target patch 508. The similarity functions (e.g., first similarity function 524, second similarity function 526, third similarity function 528, and fourth similarity function 566 shown in FIGS. 5A and 5B) are two branch networks. The similarity functions may also include the convolutional layers that generate the feature maps (e.g., convolutional layers 506).

In one configuration, the first similarity function 524 compares the feature maps to generate a similarity map 512 used to identify N potential target locations 514 (e.g., N locations). Each location i of the N locations 514 is defined by $\{(u_i, v_i, w_0, h_0)\}$, where $w_0$ is the width and $h_0$ is height of the initial target in the first frame (e.g., target patch 508) and (u, v) are the coordinates (e.g., (x, y) coordinates) of a center of a bounding box $b_i$ 546 of each respective location 514. Each location i of the N locations 514 may be bound by the bounding box $b_i$ 546 having a width $w_0$ and a height $h_0$ of the initial target in the first frame (e.g., target patch 508). The first stage 550 outputs the N locations 514 to the second stage 552. The target has an increased likelihood of being located in or adjacent to one of the N locations 514. In one configuration, the first similarity function 524 is trained offline and does not receive online updates.

In the second stage 552, the tracker searches locally around each of the N locations 514, over multiple scales $\{\sigma_j\}$, where j is from one to M, and generates a best bounding box 516 around a location with a highest similarity to the target patch 508. The best bounding box 516 with the highest similarity may be referred to as the best box $\hat{b}$, where $\hat{b}=(\hat{u},\hat{v},\hat{w},\hat{h})$. Specifically, at the second stage 552, M·N local probe regions $\{p_{ij}=(u_i, v_i, w_0 \cdot \sigma_j \cdot t, h_0 \cdot \sigma_j \cdot t) | i=1 \ldots N, j=1 \ldots M\}$ are cropped from an area around each of the N locations 514.

That is, the probe region $p_{ij}$, cropped from the frame, has a width of $(w_0 \cdot \sigma_j \cdot t)$ and height of $(h_0 \cdot \sigma_j \cdot t)$. M is a number of scales $\sigma$, $p_{ij}$ is a local probe region, and t is a zoom parameter, shared across all probe regions, which determines a size of the image in probe regions (e.g., an amount of the probe region to be cropped). For example, if t is two, then the size of the image in a probe region is twice the size of an original image. $\sigma_j$ is a scale parameter, specific to each probe region, which is used to determine the size of the probe region. Each probe region $p_{ij}$ may have a different size due to each probe region having a different parameter $\sigma_j$. As discussed below, multiple scales may be obtained by resizing the cropped probe regions to a same size.

A similarity function (e.g., second similarity function 526) of the second stage 552 receives the target patch 508 q, resized to a square l×l, and the probe regions $p_{ij}$, all resized to a square tl×tl. FIG. 5A is not to scale, as the target patch 508 q, resized to the square l×l, and the probe regions $p_{ij}$, all resized to the square tl×tl, are shown as rectangles instead of squares. The variables l and t have values determined by the neural network.

The similarity function of the second stage 552 produces M·N two-dimensional (2D) similarity maps 518. That is, as shown in FIG. 5A, the second stage 552 receives the N locations 514 and scales each of the N locations 514 over various scales. For example, a first location of the N locations 514 may include a first scaled version 520 and a second scaled version 522. Convolutional layers 506 receive the scaled N locations 514 and the target patch 508 and generate feature maps of the inputs. As previously discussed, convolutional layers 506 that generate feature maps for each stage are components of a similarity function for a respective stage. The second similarity function 526 receives the feature maps and compares the feature maps to generate 2D similarity maps 518. A best bounding box 516 (e.g., best box $\hat{b}$) has the greatest similarity to the target patch 508. In one configuration, the second similarity function 526 is updated online.

Figure 5B:
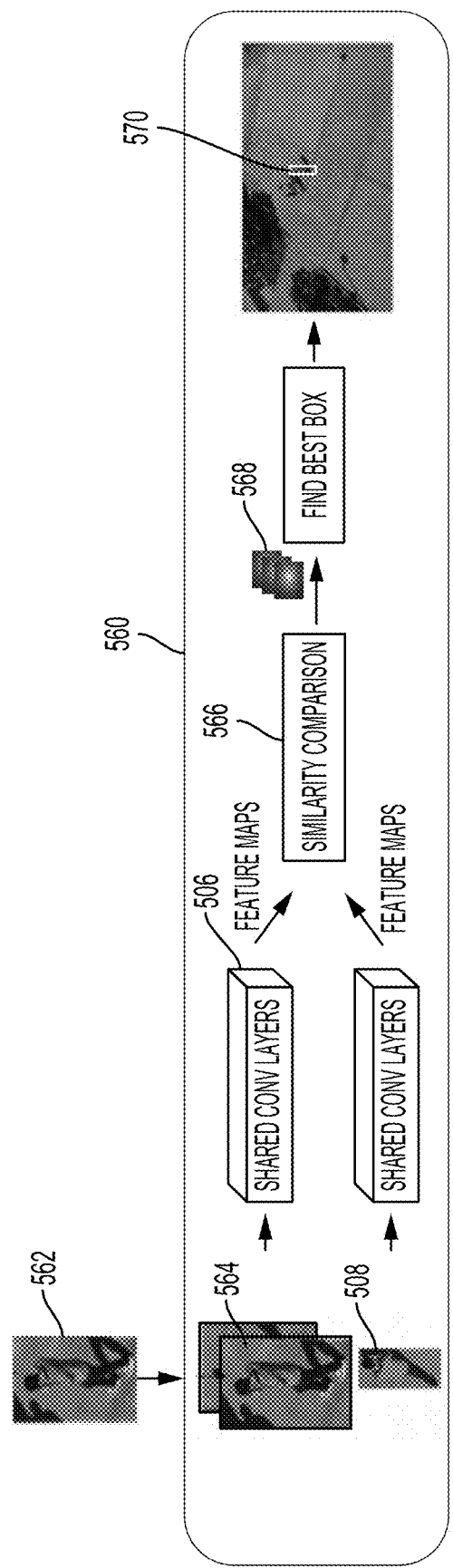
FIG. 5B illustrates an example of a local target search according to aspects of the present disclosure.

In one configuration, a greater input resolution (e.g., larger probe region) is used for the third stage 554 in comparison to the other stages 550, 552. At the third stage 554, the tracking system searches around the best bounding box 516 over multiple finer scales $\{\tilde{\sigma}\}$, where j is from one to L, that span the scale interval $\{\sigma_j\}$, where j is from one to M. The third stage 554 improves localization in both spatial and scale spaces. That is, L probe regions 530 $\{\tilde{p}_j=(\hat{u},\hat{v},\hat{w}\cdot\tilde{\sigma}_j\cdot t, \hat{h}\cdot\tilde{\sigma}_j\cdot t) | j=1 \ldots L\}$ are sampled around the best bounding box 516. The initial target q (e.g., target patch 508) is resized to a square $\tilde{l}\times\tilde{l}$ where $\tilde{l}>l$, and the image within each probe regions $\tilde{p}_j$ is resized to a square $t\tilde{l}\times t\tilde{l}$, where $\tilde{l}$ may be a variable with a value selected by the neural network. Specifically, for each probe region 530, the third stage 554 crops the image within the probe region and resizes the cropped image to a square $t\tilde{l}\times t\tilde{l}$. A size of the probe region is larger than the best bounding box 516. For example, as shown in FIG. 5D, the probe regions 590B, 590C, and 590D are larger than a bounding box 590A. The resized initial target q and the images in the probe regions $\tilde{p}_j$ are input to a similarity function (e.g., third similarity function 528). The final prediction $\tilde{b}$ (e.g., final bounding box 534) for the location of the target in the current frame 504 is determined by selecting an image from the probe regions $\tilde{p}_j$ having the largest value on the similarity maps.

As shown in FIG. 5A, the third stage 554 uses the best bounding box 516 to determine multiple larger probe regions 530. Specifically, the (x, y) coordinates and the width and height of the probe regions 530 are determined from the best bounding box 516. One or more of the probe regions 530 may also include the area encompassed by the best bounding box 516. In FIG. 5A, for clarity the probe regions 530 of the third stage 554 are similar to the first scaled version 520 and a second scaled version 522 of the second stage 552. Still, aspects of the present disclosure are intended for the probe regions 530 to be larger than the first scaled version 520 and a second scaled version 522 of the second stage 552. That is, the number of pixels in each probe region 530 is greater than the number of pixels of the first scaled version 520 and a second scaled version 522 of second stage 552. Furthermore, the target patch 508 of the third stage 554 has more pixels than the target patch 508 of the previous stages 550, 552.

The multiple finer scaled probe regions 530 and the target patch 508 are input to the convolutional layers 506 to generate feature maps of the inputs. A third similarity function 528 receives the feature maps and compares the feature maps to generate 2D similarity maps 532. A final bounding box 534 b̂ is placed around a candidate from the multiple finer scaled probe regions 530 having the greatest similarity to the target patch 508. In one configuration, the third similarity function 528 is trained offline and does not receive online updates. The final bounding box 534 has a better fit around the target in comparison to the best bounding box 516.

According to aspects of the present disclosure, a local search is also performed between frames of the global search. FIG. 5B illustrates an example of a local search 560 according to aspects of the present disclosure. As shown in FIG. 5B, for the local search 560, a tracker receives a predicted location 562 from a previous frame. The predicted location 562 may be bound by a bounding box (not shown in FIG. 5B). The tracker generates multiple probe regions 564 over multiple scales WI substantially similar to the previously estimated scale of a target. For the local search 560 and the global search 500, the target patch 508 is an initial patch of the target given in the first frame of a sequence. Convolutional layers 506 receive the multiple probe regions 564 and the target patch 508 and generate feature maps of the inputs. The fourth similarity function 566 receives the feature maps and compares the feature maps to generate 2D similarity maps 568. A second bounding box 570 is placed around the location within one of the multiple probe regions 564 having the greatest similarity to the target patch 508. The fourth similarity function 566 may be trained offline.

Figure 5C:
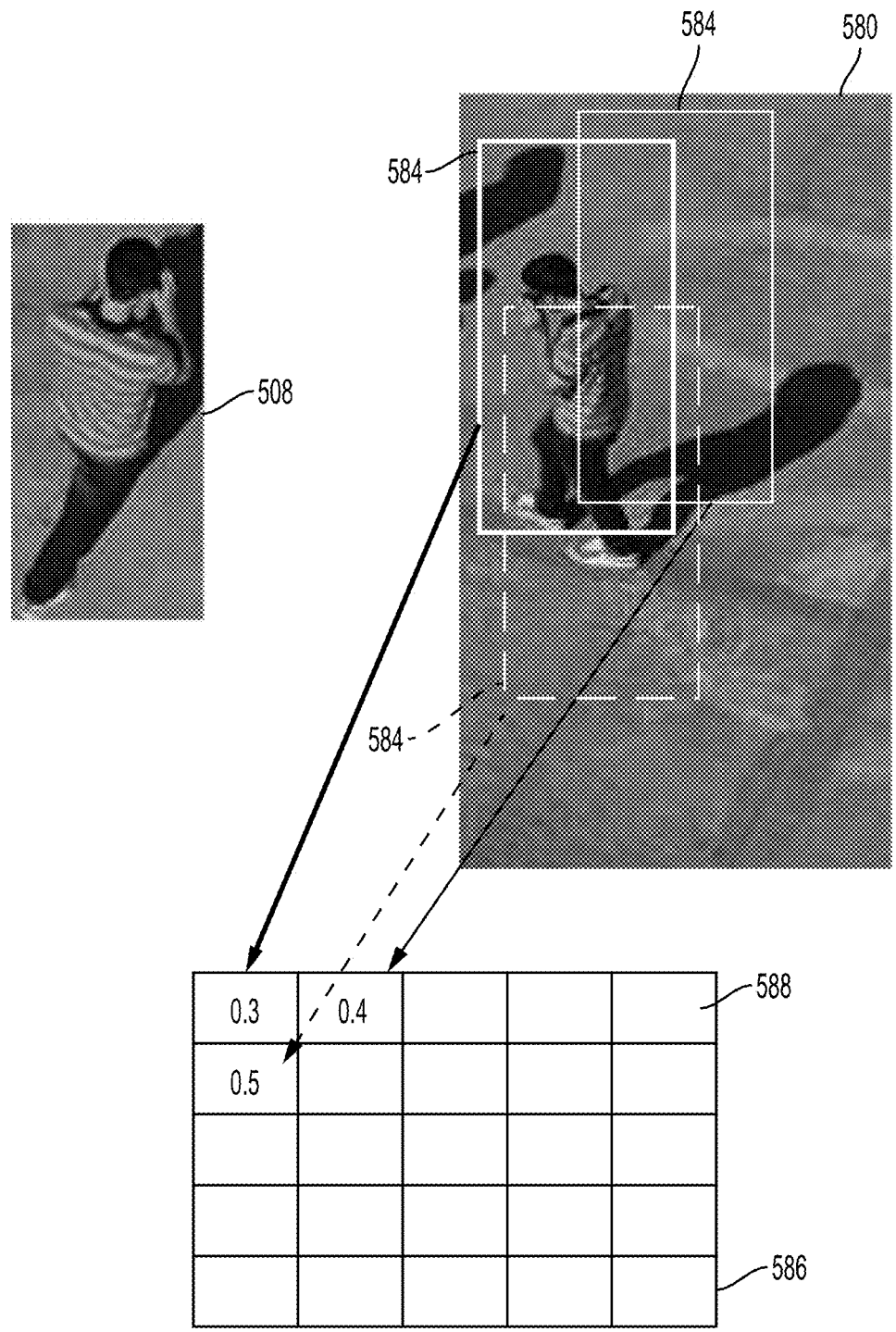
FIG. 5C illustrates an example of searching a probe region according to aspects of the present disclosure.
Figure 5D:
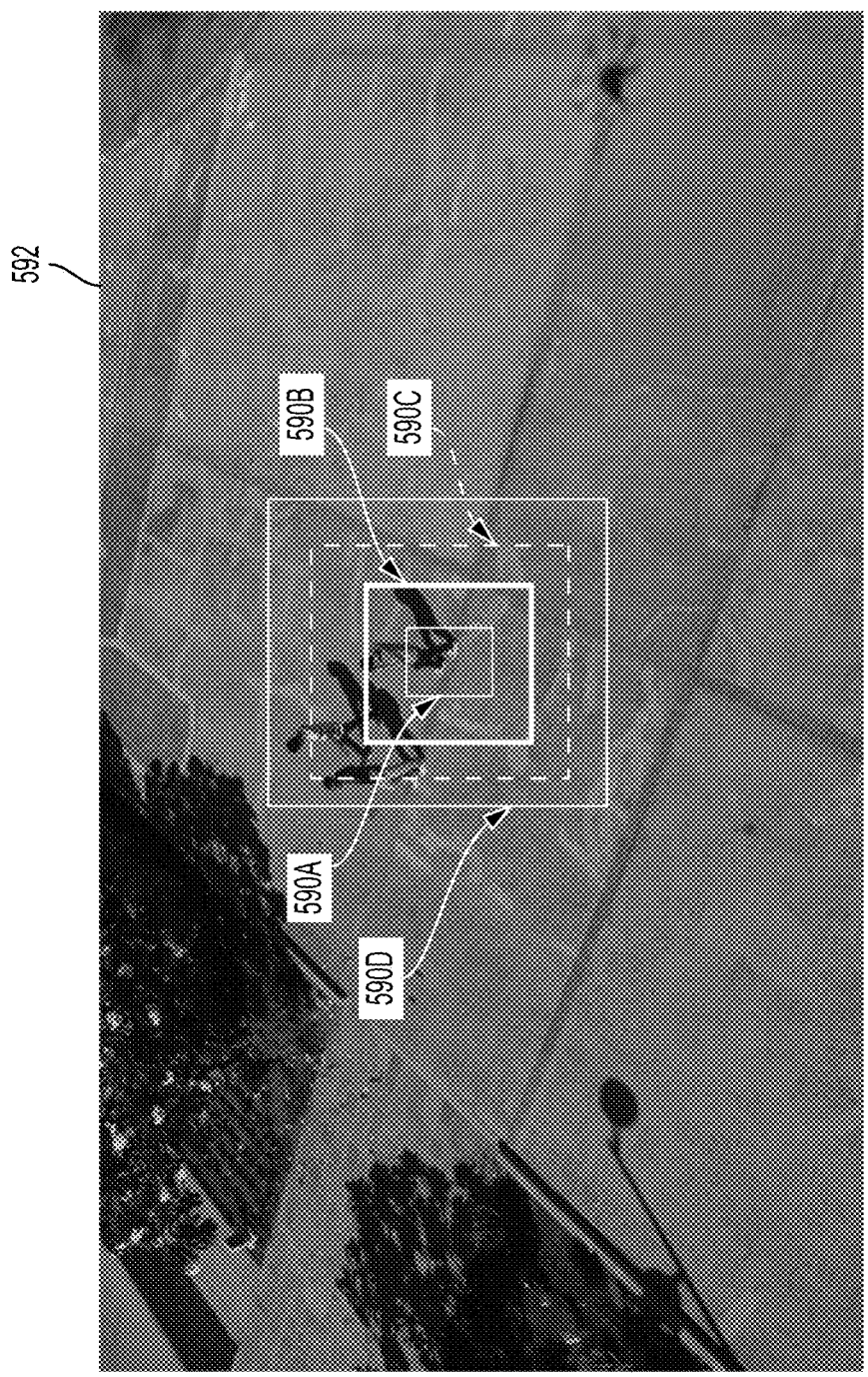
FIG. 5D illustrates an example of generating probe regions according to aspects of the present disclosure.

FIG. 5C illustrates an example of searching a probe region 580 according to aspects of the present disclosure. The probe region 580 is a region used to search for a candidate that is most similar to the target patch 508. The probe region 580 may be the current frame 504 from the first stage 550, the N locations 514 scaled over various scales from the second stage 552, the finer scaled probe regions 530 from the third stage 554, and/or the multiple probe regions 564 from the local search 560.

As shown in FIG. 5C, multiple bounding boxes 584 are used to search the probe region 580 to identify an area (e.g., candidate) that is similar to the target patch 508. That is, each bounding box 584 is a candidate for a potential target location. The dimensions of each bounding box 584 are the same as the dimensions of the target patch 508. For illustrative purposes, FIG. 5C shows three bounding boxes 584. However, more bounding boxes 584 may be used to search through the probe region 580 for a candidate that is similar to the target patch 508.

A similarity function of the artificial neural network may determine a similarity between the target patch 508 and each bounding box 584. That is, the similarity function may determine the similarity between an image in the target patch 508 and an image in a bonding box 584. A two-dimensional similarity map 586 may be generated by the similarity function. Each cell 588 of the similarity map may include a similarity score for the similarity between the target patch 508 and one of the bounding boxes 584. That is, each cell 588 may correspond to a different bounding box 584.

FIG. 5D illustrates an example of obtaining different scaled probe regions from a frame 592 according to aspects of the present disclosure. As discussed, the tracking system searches around a location over multiple different scales. For example, different scales may be used in searches performed in the second stage 552 and the third stage 554 of the global search 500 and/or during the local search 560.

In FIG. 5D, the first bounding box 590A corresponds to an initial search location. For example, the first bounding box 590A may correspond to one of the N potential target locations 514 identified during the first stage 550 of the global search 500. As another example, the first bounding box 590A may correspond to a predicted location 562 from the local search 560. The tracker (e.g., artificial neural network) may crop multiple probe regions (one for each scale) around the first bounding box 590A. For example, the tracker may crop a second bounding box 590B, a third bounding box 590C, and a fourth bounding boxes 590D.

An area within each bounding box 590A, 590B, 590C, 590D may be cropped to generate a probe region. Each probe region may then be resized to have a similar size. For example, the probe region within the third bounding box 590C and the fourth bounding boxes 590D may be resized to the size of the second bounding box 590B. The resizing provides multiple scales. After resizing, the candidate target within each of the probe regions has a different size (e.g., scale). Once the probe regions are resized, a similarity map (see FIG. 5C) is generated for each probe region.

As shown in FIGS. 5A, 5B, and 5C, a pose of a target in a current frame may be different from a pose of the target in an initial frame (e.g., target patch 508). In one configuration, the tracker is trained to learn a pose and identity of the target in the initial frame (e.g., reference input) without additional sensory information. Aspects related to learning the pose and identity of the target in a reference input without additional sensory information are described in U.S. patent application Ser. No. 15/706,541, filed on Sep. 15, 2017, and titled "LEARNING DISENTANGLED INVARIANT REPRESENTATIONS FOR ONE-SHOT INSTANCE RECOGNITION," the disclosure of which is expressly incorporated by reference herein in its entirety.

Figure 6:
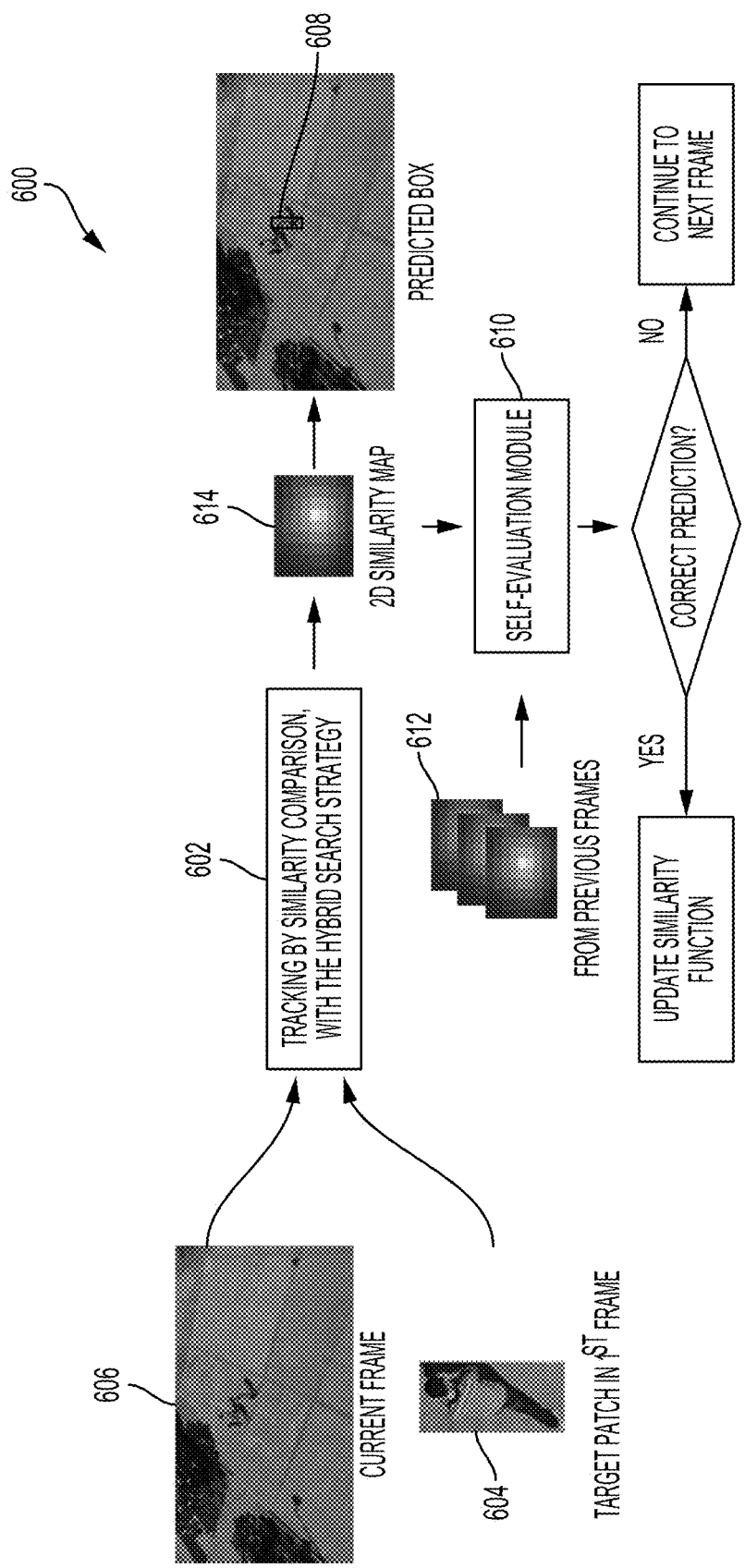
FIG. 6 illustrates an example of a target tracking system according to aspects of the present disclosure.

FIG. 6 illustrates an example of a process of target tracking 600 according to aspects of the present disclosure. As shown in FIG. 6, a similarity module 602 receives, as an input, a current frame 606 and a target patch 604 from a first frame of a sequence of frames. The similarity module 602 may be a two branch artificial neural network. Each branch may be a fully convolutional neural network. Furthermore, each branch may be identical.

In one configuration, a first branch receives, as the query, the target patch 604 q (e.g., initial image patch of the target) and generates a 3D representation $\varphi(q)$. A second branch receives the current frame 606 p and generates a 3D representation $\varphi(p)$. The current frame 606 may be the full frame or a cropped region of the frame depending on whether a global search or a local search is performed. The similarity module 602 uses a similarity function to determine a similarity between the target patch 604 and candidates of the current frame 606 based on a cross-correlation operation f(q, p)=φ(q)*φ(p). The candidates refer to translated windows in the current frame 606 having a similar size as the target patch 604. The output of the similarity module 602 is a 2D similarity map 614 S, where S=f(q, p). Each value on the similarity map 614 represents the similarity between the target patch 604 and a corresponding candidate of the current frame 606.

A predicted location 608 is determined based on the similarity map 614. That is, the predicted location 608 is an area of the similarity map 614 with the highest similarity value. The predicted location 608 may be identified by a bounding box. During a global search, the similarity map 614 of the current frame 606 may be input to a self-evaluation module 610. A model update is performed based on a determination of the self-evaluation module 610. The self-evaluation module 610 may be a binary classifier.

The self-evaluation module 610 also receives one or more similarity maps 612 from previous frames. In one configuration, the self-evaluation module 610 receives the similarity map 614 and the previous similarity maps 612 as inputs. Based on the inputs, the self-evaluation module 610 determines whether the predicted location 608 (e.g., current similarity map 614) is correct.

As shown in FIG. 6, if the predicted location 608 is correct, the similarity function of a second stage of the global search is updated (e.g., the model is updated). Alternatively, if the predicted location 608 is incorrect, the tracking system moves to the next frame and the model is not updated. That is, the similarity function is updated if the target is in the predicted location 608 (e.g., correct prediction) to improve subsequent predictions. The similarity function is not updated if the target is not in the predicted location 608 (e.g., incorrect prediction), as the incorrect prediction does not improve subsequent predictions.

The self-evaluation module 610 is trained offline in a supervised manner. During training, a predicted location may be correct if an overlap with the true target box is equal to or greater than a threshold (e.g., 0.5 intersection over union (IoU)). During training, the true target box is available. Therefore, during training, the self-evaluation module 610 knows whether a predicted box is correct. Based on the training, the online self-evaluation module 610 predicts whether a predicted location 608 is correct.

In one configuration, a long short term memory (LSTM) based binary classifier (e.g., recurrent neural network) is used for the self-evaluation module. The self-evaluation module may be conditioned on the similarity map in the current frame K and the one or more similarity maps from previous frames (K−1). For frames of a global search, the similarity map of the current frame is the similarity map generated by the third stage. The similarity map includes information indicative of a quality of the predicted target location.

For example, a sharp peak in the similarity map may indicate a correct target. Similarity maps from previous frames are incorporated to capture the temporal dynamics of the similarity distributions. In one configuration, each similarity map is encoded by a convolutional neural network. The encoded similarity maps are input to a multi-layer LSTM network. For example, the LSTM network may be a two-layer network. The hidden representation from a final layer is input to a multi-layer perceptron to obtain a classification output. The classification output is a binary output indicating a correct prediction or an incorrect prediction. In one configuration, the classification output is based on a confidence metric. If the confidence metric is above a threshold, then the classification output is true (e.g., correct). Otherwise, the classification output is false (e.g. incorrect).

The classifier of the self-evaluation module may be trained to determine whether a prediction of the target's location is correct. Given a training sequence D={($x_i$, $y_i$)}, where i is from one to N, $x_i$ is a sequence of similarity maps, and $y_i \in \{0, 1\}$ is the binary label, the classifier with parameters θ is trained by minimizing the binary cross entropy loss $$\underset{\theta}{\operatorname{argmin}} - \frac{1}{n} \sum_{i=1}^{n} y_i \cdot \log g_i + (1 - y_i) \cdot \log(1 - g_i),$$

where $g_i$ is the classification output on $x_i$.

Aspects of the present disclosure reduce the number of model updates. In one configuration, the self-evaluation module only evaluates frames used in a global search. Furthermore, the update is performed when the self-evaluation module determines the quality of the tracker's prediction is greater than a threshold (e.g., the prediction is correct).

In one configuration, the update is performed on a similarity function for the second stage of the global search. In this configuration, the similarity functions for the first and third stages are not updated. As previously discussed, the first stage determines the top N possible target locations. An offline learned similarity function may be used for the first stage. Thus, updating the offline learned model for the first stage may cause adverse effects. For example, updating the offline learned model may cause a drift that can be propagated to the later stages. The drift from the first stage may not be recovered at the later stages. Therefore, in one configuration, the similarity function for the first stage is not updated.

Additionally, the third stage refines a localization. The similarity function for the third stage may also be learned offline. As such, the model of the third stage is not updated. The second stage identifies a target, from a set of candidates, which is most similar to an initial target. The similarity function of the second stage receives different candidates based on an environment. In some cases, the candidates may not be available from offline training sets. Additionally, or alternatively, two or more similar candidates may be present in a frame. Two or more similar candidates may confuse the tracker. To adapt to the different candidates and to improve the similarity function of the second stage, the similarity function is updated online.

The similarity function for the second stage may be updated using training pairs. In one configuration, the initial target patch q from the first frame and the final predicted box of the current frame are paired as a positive training sample. The initial target patch q and the candidate patches held in the other M·(N−1) probe regions from the second stage may be negative samples. A candidate patch from the second stage is a negative sample if it does not overlap with the final prediction. The negative samples adapt the similarity function to handle confusion. With the training data P={(q, $b_i, y_i$)}, where i is from one to m and $y_i \in \{0, 1\}$, the artificial neural network of the similarity function with parameters $\theta_s$ is updated by minimizing the binary cross entropy loss $$(\text{e.g.}, \underset{\theta_s}{\operatorname{argmin}} - \frac{1}{m} \sum_{i=1}^{m} y_i \cdot \log s_i + (1 - y_i) \cdot \log(1 - s_i),$$

where $s_i$ is the similarity between q and $b_i$, normalized to [0, 1], and $b_i$ is an image patch (e.g., candidate).

Figure 7:
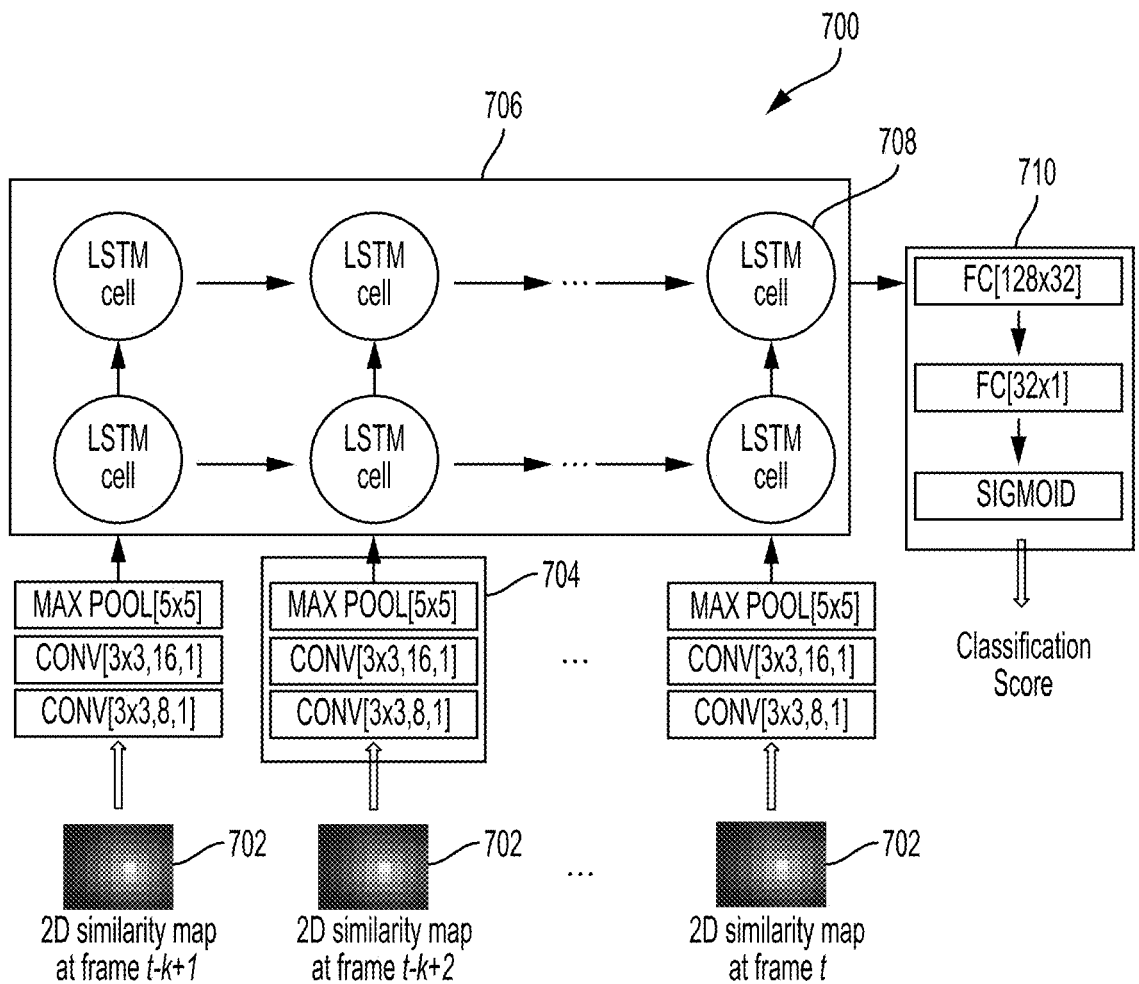
FIG. 7 illustrates an example of a self-evaluation module according to aspects of the present disclosure.

FIG. 7 illustrates an example of a self-evaluation module 700 according to aspects of the present disclosure. As shown in FIG. 7, the self-evaluation module 700 receives multiple 2D similarity maps 702 for frames t to t−(k+1), where frame t is the current frame. Each similarity map 702 is input to a multi-layer convolutional network 704. In the example of FIG. 7, the multi-layer convolutional network 704 includes two convolutional layers (CONV) with eight 3×3 convolution filters and a stride of one (e.g., [3×3, 8, 1]). The multi-layer convolutional network 704 also includes a max pooling layer (MAX POOL) that pools over a 5×5 region. The convolutional layers convolve the similarity maps 702 with filters. The max pooling layer aggregates the convolved similarity maps into a one-dimensional vector to be transmitted to a multi-layer long short term memory (LSTM) network 706.

As shown in FIG. 7, the LSTM network 706 may be a two-layer network. That is, the LSTM network 706 may include multiple layers of LSTM cells. Each layer includes two sub-layers of LSTM cells. The hidden representation from an LSTM cell 708 at the final layer is input to a multi-layer perceptron 710. In the example of FIG. 7, the multi-layer perceptron 710 includes two fully connected (FC) layers with an input dimensionality of thirty-two and an output dimensionality of one (e.g., 32×1). The multi-layer perceptron 710 also includes a sigmoid layer (SIGMOID). The sigmoid layer introduces non-linearity to the self-evaluation module 700, which is used to learn decision boundaries (e.g., failure vs. non-failure). Other non-linearities may be used, such as a rectified linear unit (ReLU). The classification output is a binary output indicating a correct prediction or an incorrect prediction. In one configuration, the self-evaluation module 700 is trained offline.

Figure 8:
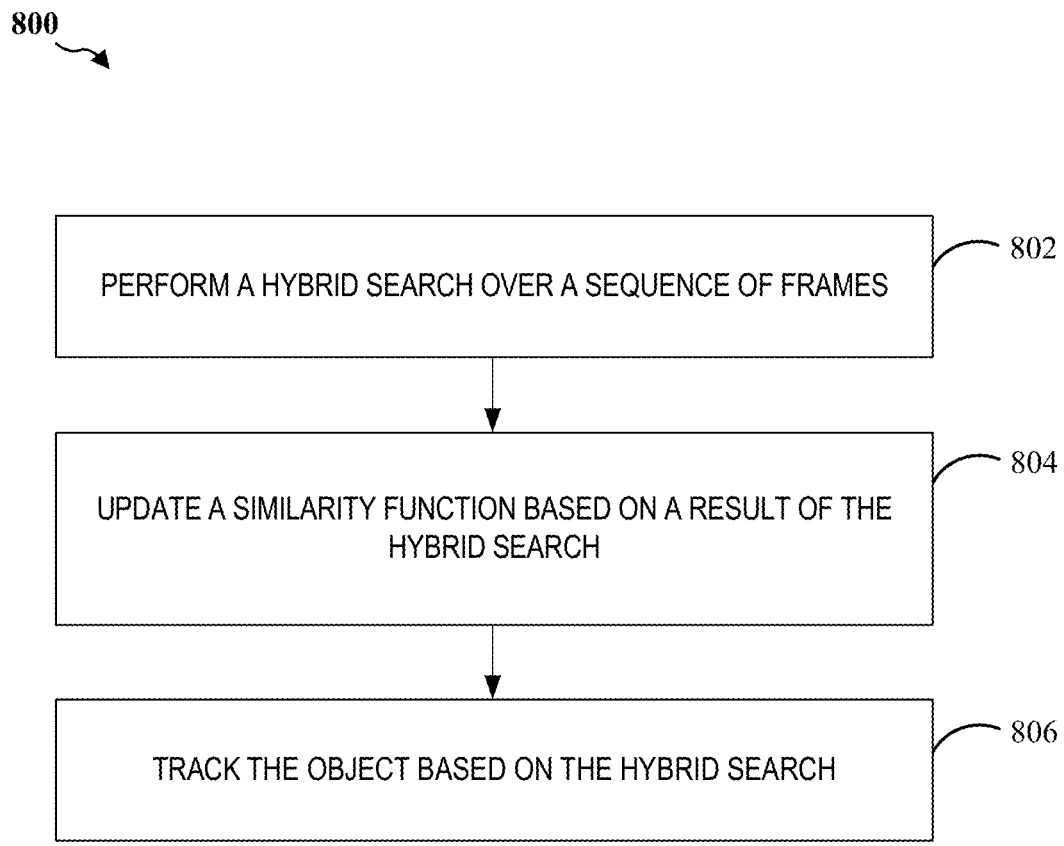
FIG. 8 illustrates a method for tracking an object according to an aspect of the present disclosure.

FIG. 8 illustrates a method 800 for tracking an object. As shown in FIG. 8, at block 802 a tracking model performs a hybrid search over a sequence of frames. The hybrid search includes periodically performing a global search on selected frames of the sequence of frames and performing a local search on frames between the selected frames of the global search. The global search includes searching at a single scale over the selected frames to identify potential locations of the object. After identifying the potential locations, the global search of the tracking model searches at different scales around the identified potential locations to select a likely box for the object. Based on the likely box, the global search of the tracking model searches at finer scales around the likely box to select a most likely box for the object. A fit of the most likely box is closer to the object in comparison to a fit of the likely box.

To reduce sampling drift while improving tracking speed, the hybrid search performs the global search once every t frames while performing the local search on frames between the global search frames. For example, the global search may be performed once every five frames. In this example, the local search would be performed in frames one to four, six to nine, eleven to fourteen, etc., while the global search is performed in frames five, ten, fifteen, etc. In one configuration, the global search is performed at non-periodic intervals that may be in a predetermined pattern, random, or dynamically determined. For example, the global search may be performed at a non-periodic interval if a detection confidence is low and/or if a target object is occluded/out-of-frame.

In one configuration, the global search is independent of the local search. That is, the global search does not receive information from the local search. In another configuration, the global search may use information from a previous local search. For example, the global search may use a target location determined from the local search.

At block 804, the tracking model updates a similarity function based on a result of the hybrid search. Updating the similarity function includes analyzing a current similarity map of the most likely box of the selected frame and previous similarity maps of previous frames. The analysis may be performed in a recurrent neural network, such as the recurrent neural network of FIG. 7. Furthermore, the similarity function determines whether the most likely box is correct based on the analysis. In one configuration, the most likely box is correct if a classification score is greater than a threshold. The classification score may be determined from analysis. Finally, the similarity function may be updated if the most likely box is correct.

The similarity function may be a two stream artificial neural network, such as a Siamese network. In one configuration, the similarity function is updated based on training pairs that include one positive pair and one or more negative pairs. The positive pair may include an initial target and a most likely box from a current frame. The most likely box may be the predicted location of the target in the current frame (see FIG. 5A, final bounding box 534). The initial target may be the target from the previous frame or the target patch from the first frame of a sequence of frames.

Additionally, the negative pairs may include the initial target and one or more candidate boxes that are different from the most likely box. The one or more candidate boxes may be the different scaled versions obtained at the second stage of the global search. The one or more candidate boxes are boxes that do not overlap with the most likely box. That is, the one or more candidate boxes are different from the most likely box.

Additionally, at block 806, the tracking model tracks the object based on the hybrid search. Tracking may include causing a device, such as a robot, to follow an object. In another configuration, an object or person of interest, such as a criminal, may be tracked in an environment, such as a stadium. In this configuration, the tracking may cause various display units to show a current location of the object/person based on various cameras located in the environment.

In some aspects, the method 800 may be performed by the SOC 100 (FIG. 1). That is, each of the elements of the method 800 may, for example, but without limitation, be performed by the SOC 100 or one or more processors (e.g., CPU 102) and/or other included components.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method of tracking an object, comprising:
performing a hybrid search over a sequence of frames, the hybrid search comprising:
intermittently performing a global search on a first set of frames of the sequence of frames; and
performing a local search on a second set of frames of the sequence of frames, the second set of frames being different from the first set of frames;
updating a similarity function based on a result of the hybrid search; and
tracking the object based on the hybrid search.

2. The method of claim 1, in which a subset of frames of the second set of frames is located between a first frame and a second frame of the first set of frames.

3. The method of claim 2, in which the global search comprises:
searching at a single scale over a selected frame of the first set of frames to identify potential locations of the object;
searching at different scales around the identified potential locations to select a likely box for the object; and
searching at finer scales around the likely box to select a most likely box for the object, a fit of the most likely box being closer to the object in comparison to a fit of the likely box.

4. The method of claim 3, in which updating the similarity function comprises:
analyzing a current similarity map of the most likely box of the selected frame and previous similarity maps of previous frames;
determining whether the most likely box is correct based on the analyzing; and
updating the similarity function when the most likely box is correct.

5. The method of claim 4, in which the current similarity map of the most likely box of the selected frame and the previous similarity maps of previous frames are analyzed with a recurrent neural network.

6. The method of claim 4, in which determining whether the most likely box is correct comprises determining a classification score based on the analyzing.

7. The method of claim 4, in which updating the similarity function comprises forming training pairs comprising a positive pair and a plurality of negative pairs.

8. The method of claim 7, in which:
the positive pair comprises an initial target and the most likely box from a current the selected frame; and
the plurality of negative pairs comprises the initial target and at least one candidate box that is different from the most likely box.

9. An apparatus for tracking an object, the apparatus comprising:
a memory; and
at least one processor coupled to the memory, the at least one processor configured:

to perform a hybrid search over a sequence of frames by:
   intermittently performing a global search on a first set of frames of the sequence of frames; and
   performing a local search on a second set of frames of the sequence of frames, the second set of frames being different from the first set of frames;
to update a similarity function based on a result of the hybrid search; and
to track the object based on the hybrid search.

10. The apparatus of claim 9, in which a subset of frames of the second set of frames is located between a first frame and a second frame of the first set of frames.

11. The apparatus of claim 10, in which the at least one processor is configured to perform the global search by:
   searching at a single scale over a selected frame from the first set of frames to identify potential locations of the object;
   searching at different scales around the identified potential locations to select a likely box for the object; and
   searching at finer scales around the likely box to select a most likely box for the object, a fit of the most likely box being closer to the object in comparison to a fit of the likely box.

12. The apparatus of claim 11, in which the at least one processor is configured to update the similarity function by:
   analyzing a current similarity map of the most likely box of the selected frame and previous similarity maps of previous frames;
   determining whether the most likely box is correct based on the analyzing; and
   updating the similarity function when the most likely box is correct.

13. The apparatus of claim 12, in which the current similarity map of the most likely box of the selected frame and the previous similarity maps of previous frames are analyzed with a recurrent neural network.

14. The apparatus of claim 12, in which the at least one processor is configured to determine whether the most likely box is correct by determining a classification score based on the analyzing.

15. The apparatus of claim 12, in which the at least one processor is configured to update the similarity function by forming training pairs comprising a positive pair and a plurality of negative pairs.

16. The apparatus of claim 15, in which:
   the positive pair comprises an initial target and the most likely box from the selected frame; and
   the plurality of negative pairs comprises the initial target and at least one candidate box that is different from the most likely box.

17. A non-transitory computer-readable medium having program code recorded thereon for tracking an object, the program code executed by a processor and comprising:
   program code to perform a hybrid search over a sequence of frames, the program code to perform the hybrid search comprising:
      program code to intermittently perform a global search on a first set of frames of the sequence of frames; and
      program code to perform a local search on a second set of frames of the sequence of frames, the second set of frames being different from the first set of frames;
   program code to update a similarity function based on a result of the hybrid search; and
   program code to track the object based on the hybrid search.

18. The non-transitory computer-readable medium of claim 17, in which a subset of frames of the second set of frames is located between a first frame and a second frame of the first set of frames.

19. The non-transitory computer-readable medium of claim 18, in which the program code to perform the global search comprises:
   program code to search at a single scale over a selected frame of the first set of frames to identify potential locations of the object;
   program code to search at different scales around the identified potential locations to select a likely box for the object; and
   program code to search at finer scales around the likely box to select a most likely box for the object, a fit of the most likely box being closer to the object in comparison to a fit of the likely box.

20. The non-transitory computer-readable medium of claim 19, in which the program code to update the similarity function comprises:
   program code to analyze a current similarity map of the most likely box of the selected frame and previous similarity maps of previous frames;
   program code to determine whether the most likely box is correct based on the analyzing; and
   program code to update the similarity function when the most likely box is correct.

21. The non-transitory computer-readable medium of claim 20, in which the current similarity map of the most likely box of the selected frame and the previous similarity maps of previous frames are analyzed with a recurrent neural network.

22. The non-transitory computer-readable medium of claim 20, in which the program code to determine whether the most likely box is correct comprises program code to determine a classification score based on a comparison of the current similarity map and the previous similarity maps.

23. The non-transitory computer-readable medium of claim 20, in which the program code to update the similarity function comprises program code to form training pairs comprising a positive pair and a plurality of negative pairs.

24. The non-transitory computer-readable medium of claim 23, in which:
   the positive pair comprises an initial target and the most likely box from the selected frame; and
   the plurality of negative pairs comprises the initial target and at least one candidate box that is different from the most likely box.

25. An apparatus for tracking an object, the apparatus comprising:
   means for performing a hybrid search over a sequence of frames, the hybrid search comprising:
      means for intermittently performing a global search on a first set of frames of the sequence of frames; and
      means for performing a local search on a second set of frames of the sequence of frames, the second set of frames being different from the first set of frames;
   means for updating a similarity function based on a result of the hybrid search; and
   means for tracking the object based on the hybrid search.

26. The apparatus of claim 25, in which a subset of frames of the second set of frames is located between a first frame and a second frame of the first set of frames.

27. The apparatus of claim 26, in which the means for periodically performing the global search comprises:

means for searching at a single scale over a selected frame of the first set of frames to identify potential locations of the object;

means for searching at different scales around the identified potential locations to select a likely box for the object; and means for searching at finer scales around the likely box to select a most likely box for the object, a fit of the most likely box being closer to the object in comparison to a fit of the likely box.

28. The apparatus of claim 27, in which the means for updating the similarity function comprises:

means for analyzing a current similarity map of the most likely box of the selected frame and previous similarity maps of previous frames;

means for determining whether the most likely box is correct based on the analyzing; and means for updating the similarity function when the most likely box is correct.

29. The apparatus of claim 28, in which the current similarity map of the most likely box of the selected frame and the previous similarity maps of previous frames are analyzed with a recurrent neural network.

30. The apparatus of claim 28, in which the means for determining whether the most likely box is correct comprises means for determining a classification score based on a comparison of the current similarity map and the previous similarity maps.

* * * * *